(12) United States Patent
Singleton

(10) Patent No.: US 7,116,228 B1
(45) Date of Patent: Oct. 3, 2006

(54) ASSET MANAGEMENT SYSTEM

(75) Inventor: Steve D. Singleton, Roswell, GA (US)

(73) Assignee: Key Control Holding, Inc., Houston, TX (US)

( * ) Notice: Subject to any disclaimer, the term of this patent is extended or adjusted under 35 U.S.C. 154(b) by 0 days.

(21) Appl. No.: 10/079,920

(22) Filed: Feb. 20, 2002

Related U.S. Application Data

(60) Provisional application No. 60/288,200, filed on May 2, 2001, provisional application No. 60/269,808, filed on Feb. 20, 2001.

(51) Int. Cl.
*G08B 13/14* (2006.01)

(52) U.S. Cl. .............................. 340/572.1; 340/572.4; 340/572.8; 340/568.1

(58) Field of Classification Search ............. 340/572.1, 340/572.8, 568.1, 571, 540
See application file for complete search history.

(56) References Cited

U.S. PATENT DOCUMENTS

| | | | |
|---|---|---|---|
| 3,451,043 A | 6/1969 | Krause ........................ 340/152 |
| 4,209,787 A | 6/1980 | Freeny, Jr. | |
| 4,275,385 A | 6/1981 | White | |
| 4,549,170 A | 10/1985 | Serres et al. | |
| 4,885,571 A | 12/1989 | Pauley et al. | |
| 4,896,024 A | 1/1990 | Morello et al. | |
| 4,918,432 A | 4/1990 | Pauley et al. | |
| 4,967,906 A | 11/1990 | Morello et al. | |
| 5,836,002 A | 11/1998 | Morstein et al. | |
| 5,905,653 A | 5/1999 | Higham et al. | |
| 5,957,372 A | 9/1999 | Dean et al. | |
| 5,961,036 A | 10/1999 | Michael et al. | |
| 6,069,563 A | 5/2000 | Kadner et al. | |
| 6,073,834 A | 6/2000 | Michael et al. | |
| 6,392,543 B1 * | 5/2002 | Maloney ................... 340/568.1 |
| 6,407,665 B1 * | 6/2002 | Maloney ................... 340/568.1 |
| 6,501,379 B1 * | 12/2002 | Maloney ................... 340/568.1 |
| 6,707,381 B1 | 3/2004 | Maloney | |
| 6,745,366 B1 | 6/2004 | Roh et al. | |
| 6,788,997 B1 | 9/2004 | Frederick | |
| 6,812,838 B1 * | 11/2004 | Maloney ................... 340/568.1 |
| 6,867,695 B1 * | 3/2005 | Prado et al. .............. 340/568.1 |

FOREIGN PATENT DOCUMENTS

| | | |
|---|---|---|
| GB | 1364535 | 8/1974 |
| WO | WO 00/16280 | 3/2000 |
| WO | WO 00/16281 | 3/2000 |
| WO | WO 00/16282 | 3/2000 |
| WO | WO 00/16284 | 3/2000 |
| WO | WO 00/16564 | 3/2000 |

OTHER PUBLICATIONS

Memory-Based Identifier Tag Provides Digital ID- Dave Bursky—Electronic Design—Jul. 25, 1992—pp. 153 and 156.

\* cited by examiner

*Primary Examiner*—Toan N. Pham
(74) *Attorney, Agent, or Firm*—Jackson Walker L.L.P.; Mark A. Tidwell, Esq.

(57) ABSTRACT

The invented system and its components utilize RFID (Radio Frequency Identification) technology to store and locate assets or asset control devices within security enclosures of a wide range of sizes and configurations.

17 Claims, 17 Drawing Sheets

ASSET MANAGEMENT SYSTEM

RELATED APPLICATION DATA

This application claims benefit of provisional patent application Ser. No. 60/269,808 entitled "ASSET MANAGEMENT SYSTEM" filed on Feb. 20, 2001, the contents of which are incorporated herein by reference. This application also claims benefit of provisional patent application Ser. No. 60/288,200 filed May 2, 2001 entitled "ASSET MANAGEMENT SYSTEM" the contents of which are also incorporated herein by reference.

BACKGROUND OF THE INVENTION

1. Field of the Invention

The invention relates generally to the field of controlling, tracking, and managing access to assets or asset control devices, such as keys at an auto dealership, by authorized users in a wide variety of sizes, locations, and types, including the ability to report and analyze the status and complete history of all inventoried assets at any time.

2. Background Art

Assets

Assets by definition have intrinsic value and in some cases require security of some kind. Some assets are themselves secured but their security can be compromised through access to a control device such as a key, remote, badge, etc. in which case the control devices themselves require security.

One example of assets requiring security is the vehicle inventory of a car or truck dealership or fleet operator. In this example, the keys and remotes for each vehicle are the control devices to be secured such that (a) only authorized users have access to them (to prevent theft and vehicle damage liabilities) and (b) each authorized user is made accountable for the vehicle keys he/she removes from the secure environment.

Another example of assets requiring security is the door keys of apartment, condominium, office, school, medical, and other buildings or groups of buildings. In this example, the building or complex maintains no master keys but keeps the management key copies in a secured environment which controls access to authorized users and records the accountability of each authorized user of each key to reduce liabilities for personal harm, theft, damage, etc.

Asset Management Without Security

Typically, managers in the field of this invention have a hundred or hundreds of assets or asset control devices to be managed. This given, unsecured methods have evolved around organization of the assets such that they can be readily located for use.

In the car dealership example, a common method has been "pegboards" or an array of hooks mounted on a wall where each asset tag has an assigned hook which allows a particular asset to be located by its stock or other code number. Even in cases where the pegboard is mounted inside a locked cabinet, the cabinet is generally unlocked and open during business hours. This method presents a number of problems and liabilities for the dealer. One problem is that there is usually no indication what employee has taken an asset that is not currently on the board. Another problem is that only honesty and consistent application of dealership policies by all employees allows this method to work—typically, assets are not properly returned to their assigned hooks and may not be returned in a timely manner since employees understand that they have no accountability. An important liability is that employees, customers, or other visitors in the dealership have easy access to vehicle keys without detection or accountability in order to steal a vehicle or use it for unauthorized purposes—legal precedent clearly assigns liability to the dealership when it has poor security or lax procedures for security and its vehicles used by unauthorized drivers become involved in personal or property damage accidents. Even in the absence of damage liability, vehicles may be damaged during their unauthorized use which causes repair costs to the dealer and possibly a lost sale if the damage is discovered in the process of conducting a prospect demonstration ride.

In the apartment or multi-family housing example, managers generally have a number of master keys which can unlock any apartment door and are assigned to specific managers, custodians, and maintenance contractors. Problems and liabilities arise because master keys can be (illegally) copied so there is no definitive way to know how many keys exist. Nor is there any accountability for each master key holder for his supervision of the key at all times and no way for management of the key holders to prove or disprove any use of the key in any apartment unit door by any master key holder. If management determines a breach of master key security, its only recourse is to re-key all apartment units and re-establish security but at a significant cost to management and with some irritation for tenants. More serious is the potential liability of tenants who may be injured during a break-in by a master key holder or who reports theft of possessions or damage to their apartment due to unauthorized entry, none of which can be aggressively disputed by management.

Secured Asset Management Without Accountability

As a result of the serious liability potential and significant costs of unsecured asset management, there have been and are still sold today in the market of this field systems or methods which provide some level of security for the assets but no accountability for even authorized users.

One such system requires badge and/or password identification of authorized users in order to electronically open a secure enclosure of assets—however, once opened, the system relies on the honesty and policy compliance of the users to properly record all of the assets they remove. With no way to prove perfect compliance among all of its users, asset managers limit only their liabilities related to casual or negligent theft but still bear the burden of proof in all other cases.

Another specific method still in use involves a locked box attached to the asset, possibly a vehicle in a car dealership or the door of a vacant apartment. While providing some security against casual theft, lock boxes once opened by an authorized user or broken into by an unauthorized user provide no accountability for the use of the secured key. In addition, this method usually results in the keys in lock boxes being attached to the asset they protect after business hours and in the least secure environments for theft.

Secured Asset Management with Accountability

There are also systems in which assets can be secured with accountability but with no application of low-frequency RFID technology. In prior mechanisms, technologies which include but are no limited to bar codes and contact-based semiconductors have been used with grids where the location of tags with bar codes and/or chips are identified by x-y coordinates. These currently existing mechanisms are inadequate or undesirable because of their high cost, limited density, restricted enclosure specifications, and/or user inefficiencies in locating tags by coordinates.

Known prior art includes U.S. Pat. No. 6,075,441 entitled "Inventoriable-Object Control and Tracking System," the disclosure of which is hereby incorporated by reference.

An object of this invention is to provide an improved asset management system that is more functional with more features than prior art systems.

Another object of this invention is to provide an improved asset management system that is more economical to manufacture with greater reliability than prior art systems.

These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention comprises a computerized system for the tracking, and management of assets and/or asset control devices stored in one or more secure enclosures. The system manages authorizations for user access and administrative purposes and maintains complete histories and audit trails for the access of each asset or asset control device in the system.

The system allows for assets or asset control devices to be attached to asset tags containing passive low-frequency radio frequency transponders with unique identification numbers. The asset tags also function as light pipes in order for the system to indicate a specific tag to the user.

The secure enclosures of varying sizes and configurations each contain an array of RFID antennae and LED's mounted on or within "scanner" printed circuit boards. One or more "reader" printed circuit board assemblies function to supply power, memory, and intelligent controls with which each position of the RFID arrays can be both scanned for the identification of an asset tag, if present, or flagged by lighting a LED which makes the tag visible to the user. For performance reasons, the reader maintains tables for the presence/absence of asset tags and for the full ID of present asset tags in all arrays. During the time a user has gained authorized access to the enclosure, the reader continuously scans all arrays and queues any access events in its memory. When the enclosure is secure and no user access is authorized, the reader performs periodic audit scans to assure the accuracy of its tables.

The system's controller computer software is alerted by any event in any security enclosure and subsequently responds to each event accordingly. The controller program function maintains a data base of the unique asset tag ID's with full descriptions of the assets they represent as well as complete histories of each asset tag access, including user, reason for access, date, and time. The controller also manages the functions of the enclosure, including opening, closing, locking, unlocking, status signals, warning and error conditions, etc.

The system's scalable software architecture allows not only multiple enclosures in each controller cluster but also multiple controller clusters in a local area network or multiple sites in an internet web-based network.

The foregoing has outlined rather broadly, the more pertinent and prominent features of the present invention. The detailed description of the invention that follows is offered so that the present contribution to the art may be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other methods and structures for carrying out the same purposes of the present invention. It should also be realized by those skilled in the art that such equivalent structures do not depart from the spirit and scope of the invention as set forth in the appended claims.

BRIEF DESCRIPTION DRAWINGS

For a more succinct understanding of the nature and objects of the invention, reference should be directed to the following description taken in conjunction with the accompanying drawings in which.

DETAILED DESCRIPTION OF THE PREFERRED EMBODIMENT

Components of the System

The invented system and its components utilize RFID (Radio Frequency Identification) technology within asset tags to store and locate assets or asset control devices within security enclosures of a wide range of sizes and configuration. The common elements of the invention include:

Tags

Figure 1:
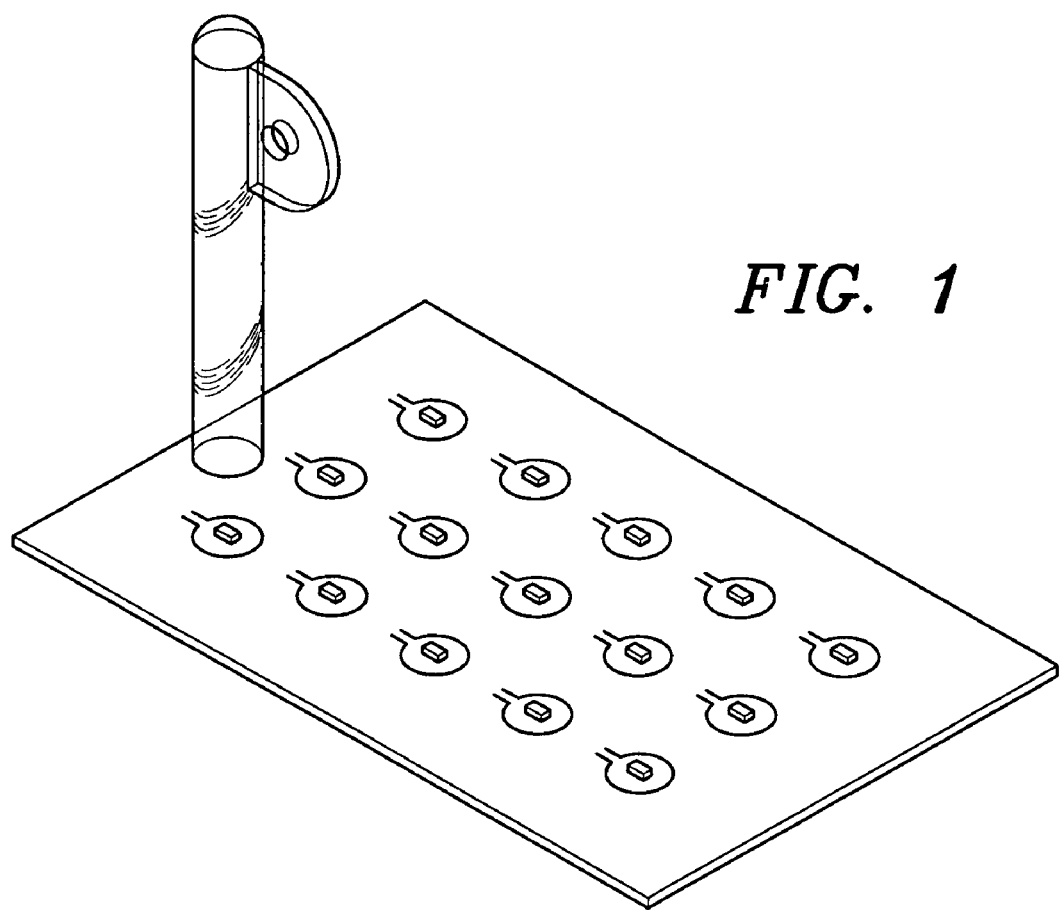
FIG. 1 is a perspective view showing the relationship between an asset tag and a scanner board according to the invention.
Figure 2:
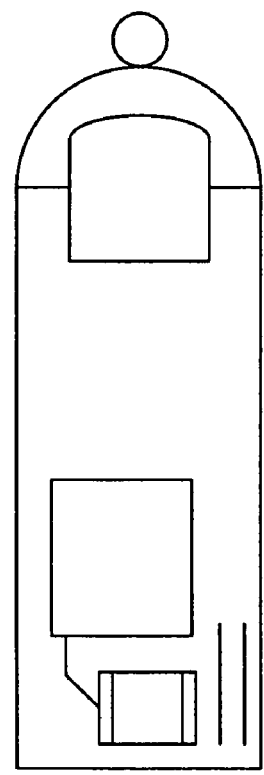
FIG. 2 is a side view of an asset tag according to one embodiment of the invention.
Figure 8:
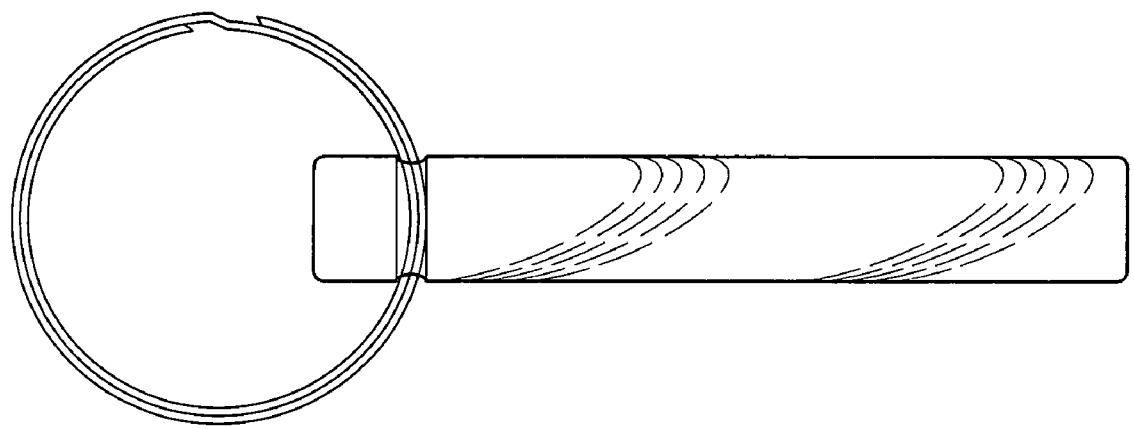
FIG. 8 is a side elevational view of an alternate embodiment of an asset tag incorporating an RFID transponder and forming a light pipe according to the invention.
Figure 9:
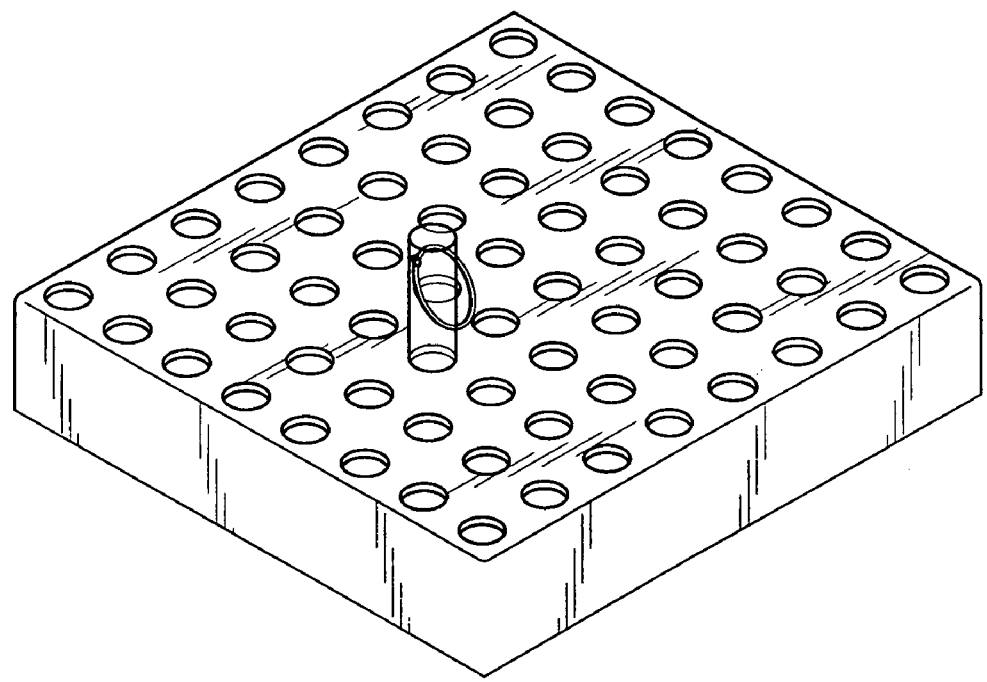
FIG. 9 is a perspective view of a top panel for use in an openable drawer according to the invention.
Figure 10:
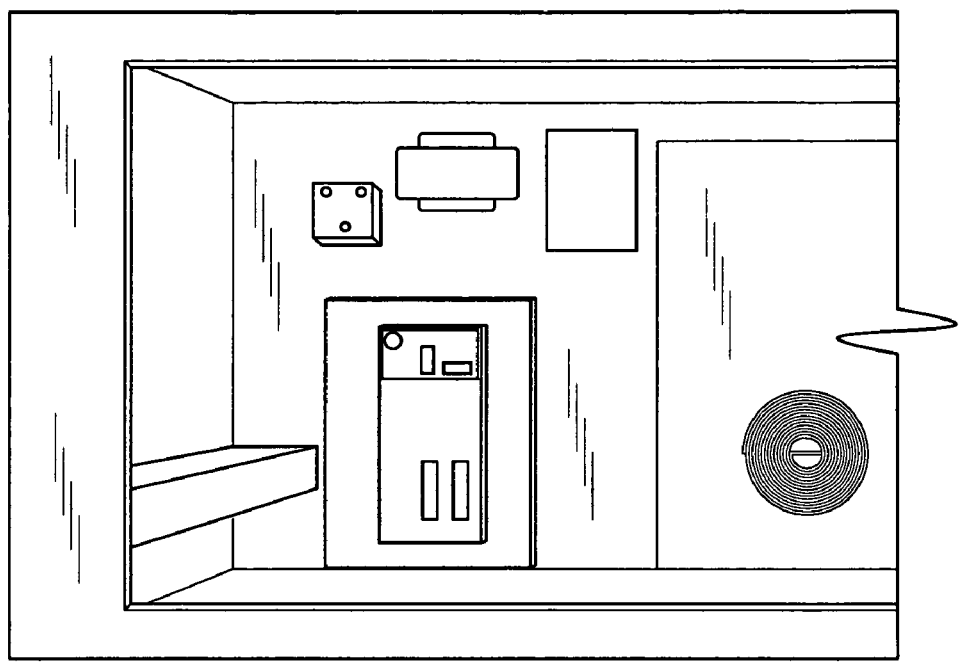
FIG. 10 is an internal view of a portion of the drawer showing a possible placement of the reader board therein.
Figure 11:
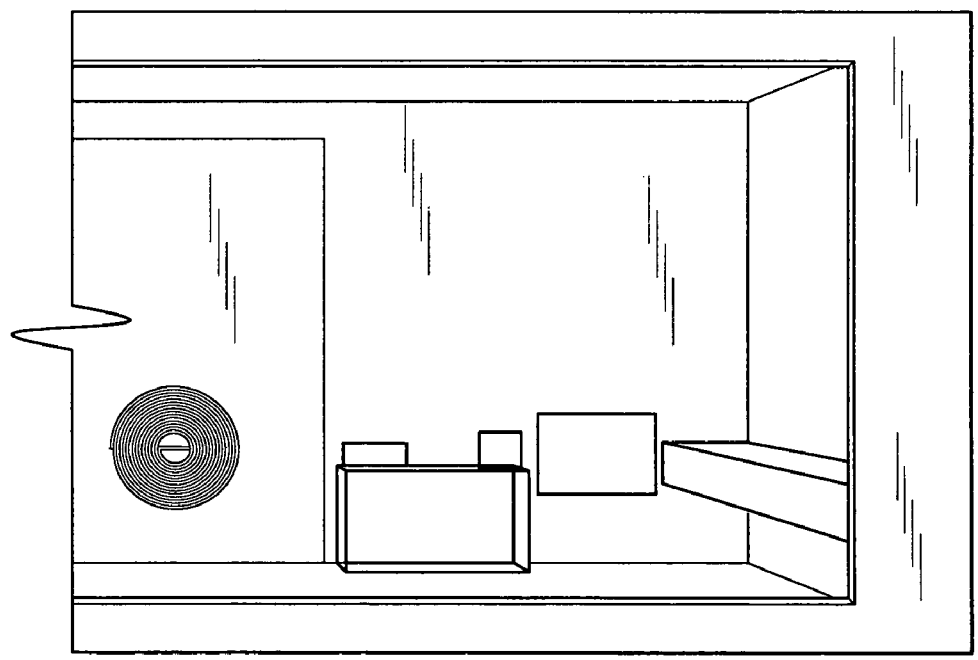
FIG. 11 is an internal view of the drawer.

Asset tags 11 in the illustrated embodiment comprise transparent or translucent plastic rods 12 having hooks 13. The asset tags 11 may be of various sizes and shapes and contain embedded passive low-frequency RFID transponders 14 with unique identification codes and their associated antennae 16. The asset tags 11 also serve as light pipes. Assets or asset control devices, such as keys, are securely attached to the asset tags 11. Tags 11 may be re-used in cases where the assets associated with them have been retired or replaced. Asset tags 11 are designed such that they can be placed in arrays within security enclosures 21 (FIG. 3) such that RFID transceivers within the security enclosures 21 can activate and read the unique tag ID's and subsequently identify the associated asset attached to the asset tag 11. FIGS. 1 and 2 illustrate one possible embodiment of asset tags 11 that can be employed with the present invention. FIG. 8 illustrates an alternate asset tag embodiment.

Security Enclosures

Figure 3:
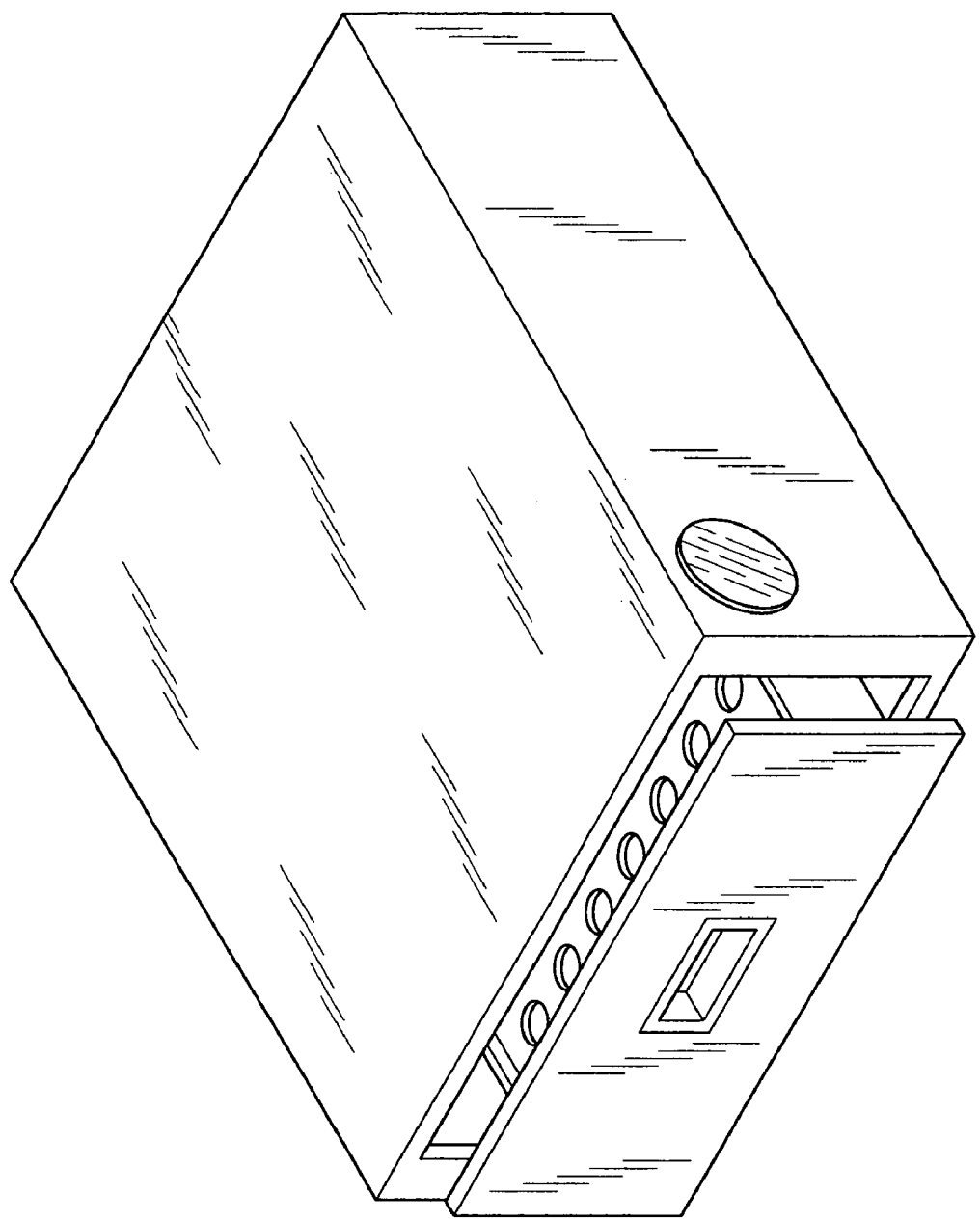
FIG. 3 is a perspective view of an opened security enclosure in the form of a drawer showing storage of asset tags therein.
Figure 4:
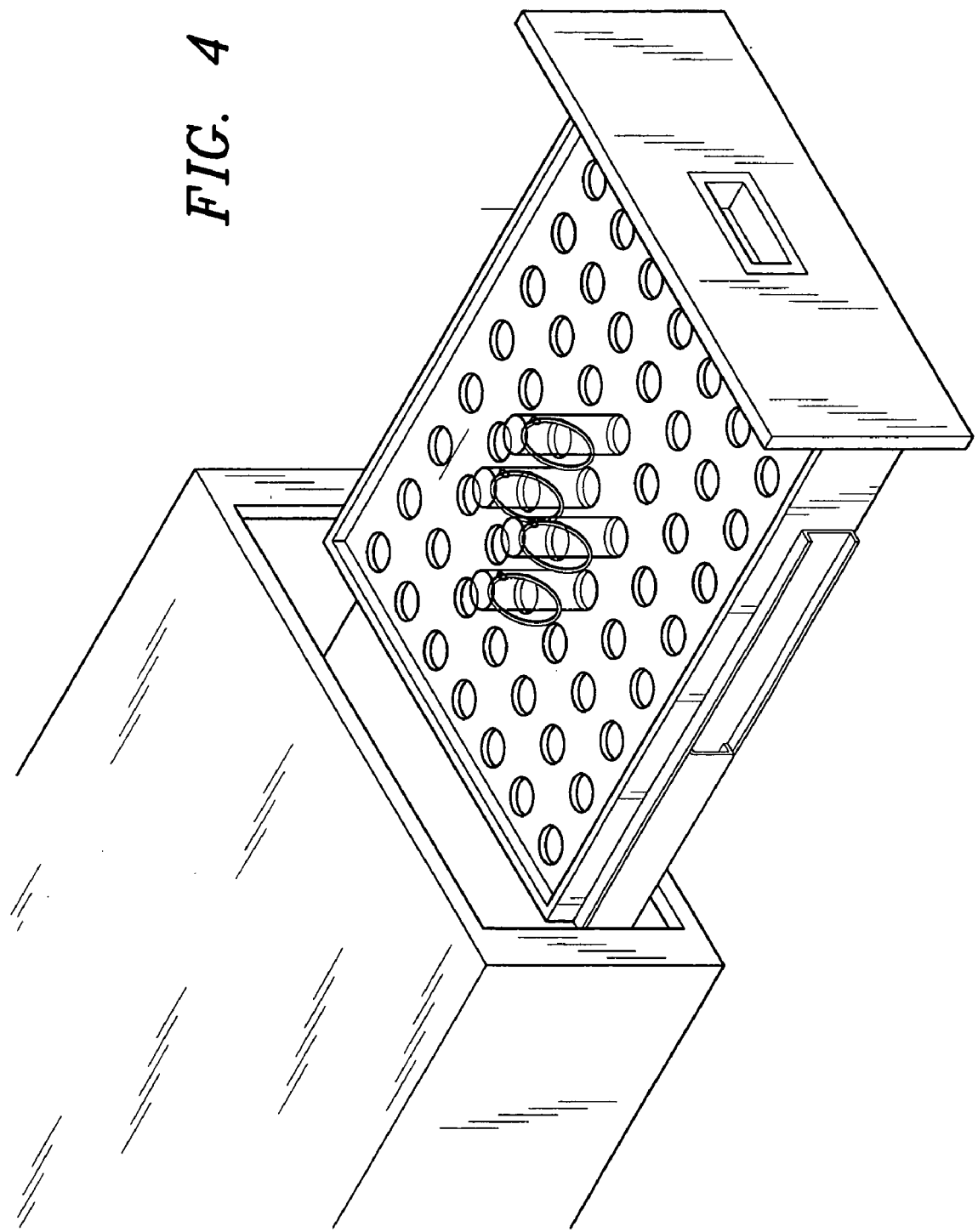
FIG. 4 is a perspective view of a portion of the drawer of FIG. 3 illustrating a preferred placement of an external tag reader thereon.
Figure 5:
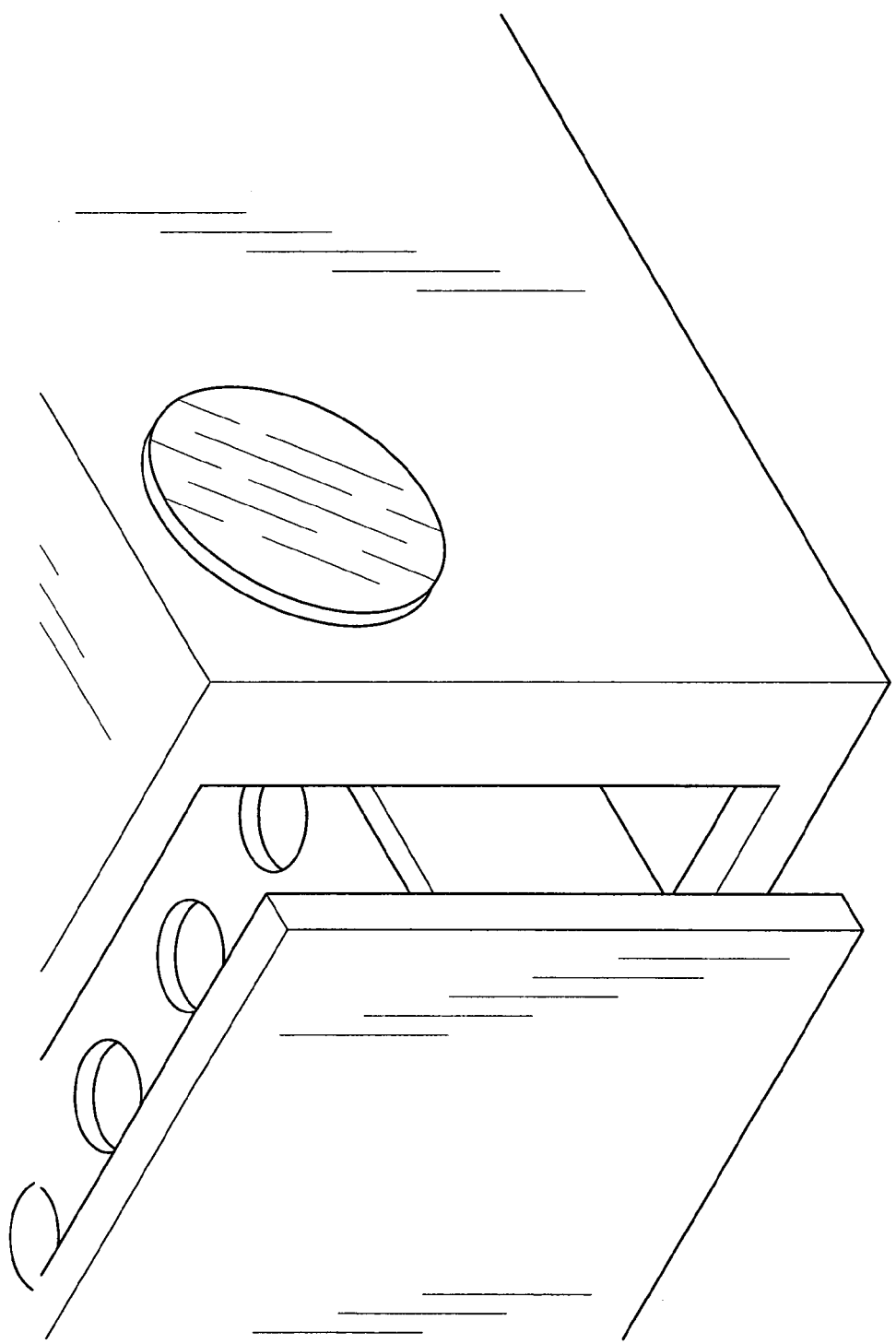
FIG. 5 is a side elevational view of a portion of an opened drawer showing asset tags and the external tag reader.
Figure 6:
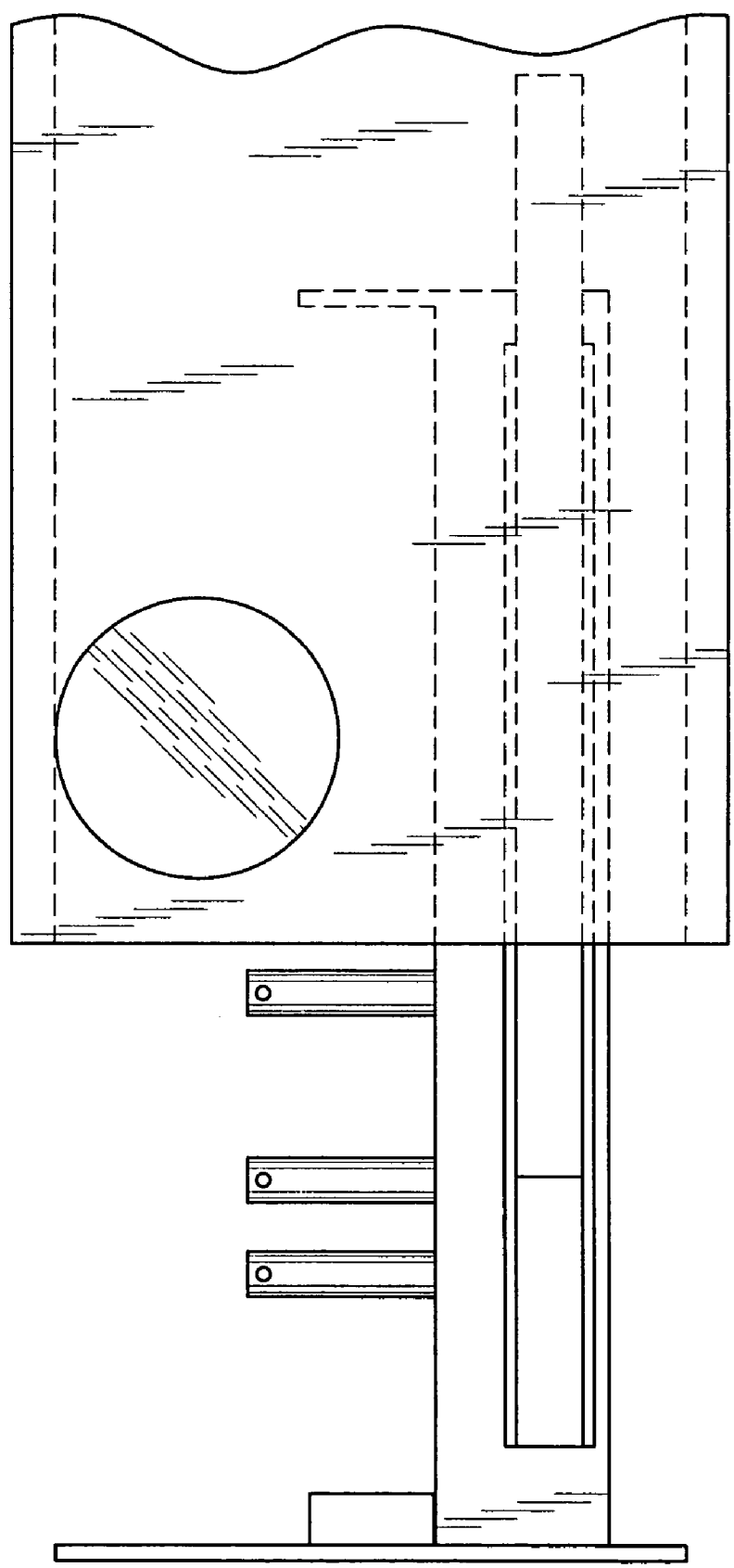
FIG. 6 is a side elevational view of an opened drawer according to one embodiment of the invention.
Figure 7:
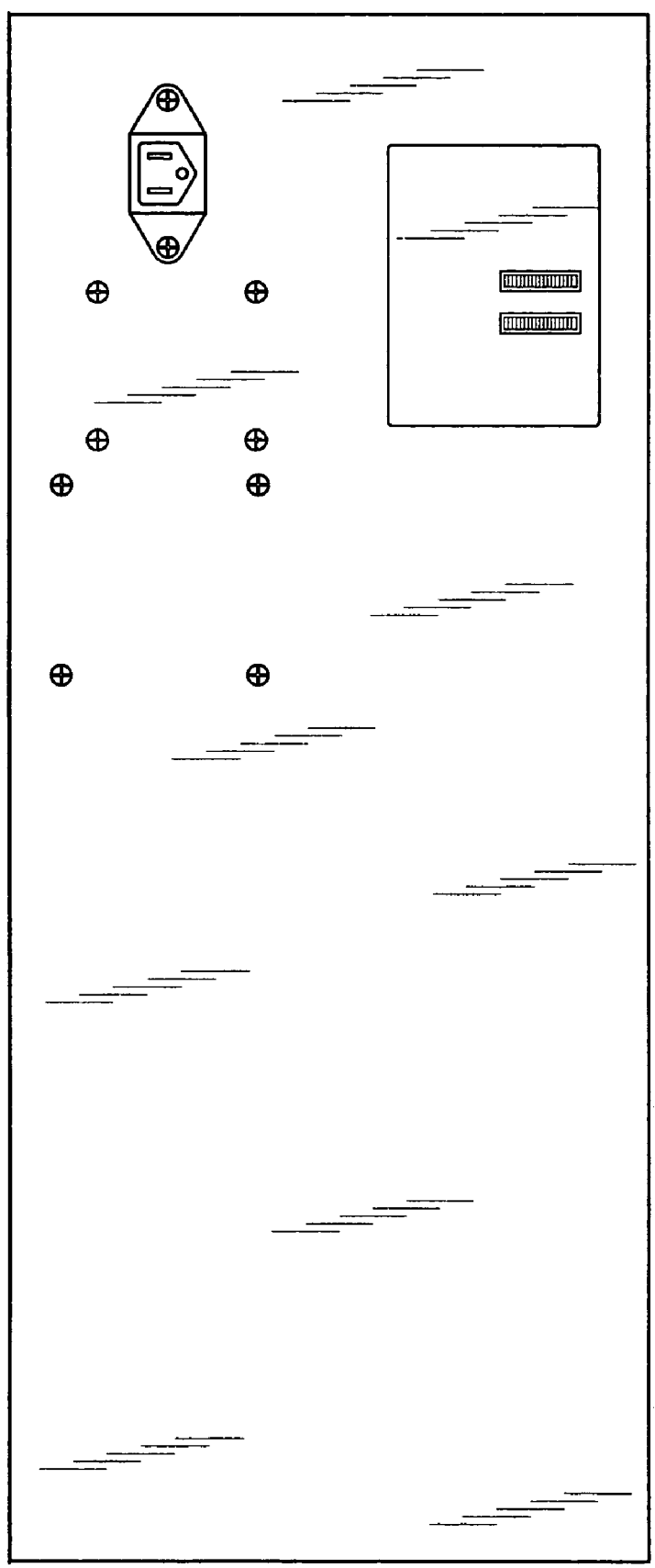
FIG. 7 is a rear elevational view illustrating the back panel of an openable drawer according to an embodiment of the invention.

FIGS. 3–5 best illustrate a preferred configuration of a security enclosure 21 in the form of an openable drawer. Although a drawer is the preferred form of security enclosure, a wide variety of horizontal, drawer-mounted or vertical, wall- or cabinet-mounted racks which allow tags and their attached assets or asset control devices to be inserted, stored, and removed may be used. The system of this invention controls the functions of the security enclosure 21 such that only authorized users can gain access. Further, once accessed, the system assigns accountability for each asset tag 11 removed to the authorized user, recording the date, time, and reason for use. Each enclosure 21 must have capabilities to be opened and closed and/or locked and unlocked electronically and for its security status to be determined electronically by the system.

Scanner Boards

A scanner board 22 (FIGS. 1 and 1A) is mounted within the security enclosure 21. The scanner board 22 carries an array of RFID transceivers 23 and LED's 24. The transceivers 23 and LEDs 24 are positioned so that a transceiver and its LED align directly beneath an asset tag 11 when the tag is stored in the corresponding position within the enclosure 21. The spacing is such that densely stored asset tags can be caused to flash red and easily located in the array by users when the corresponding LED beneath the tag is flashed. Each security enclosure 21 is populated with one or more scanner boards 22, all of which are connected to reader boards (described below). FIGS. 13–19 include schematics, firmware and application software, and operational flow of the scanner boards.

Reader Boards

Each reader board 26 controls one or more scanner boards 22 and causes the array of transceivers on the scanner boards to be scanned continuously. The reader board 26 maintains a table of array locations where asset tags are present and absent and a table of unique tag ID's for all locations where tags are present. During its continuous scan, any change in the status of tags is an event recorded in an event queue, which causes notification to the system's controller software. The reader board 26 can also cause the LED at a specific array location to be lit on direction of the system controller software and this light is transmitted upwardly through the asset tag 11 thereby illuminating the tag to identify the tag being requested by a user. The reader board 26 also performs a full audit scan of all tag ID's present on closure of the security enclosure 21 and periodically thereafter until the enclosure 21 is re-opened and continuous scanning is re-started. FIGS. 13–19 include schematics, firmware and application software, and operational flow of the reader boards.

External Tag Reader

Each enclosure, cluster of enclosures, or group of enclosure clusters must include at least one external tag reader 27, which may be electronically attached to the reader board 26, controller computer, or host computer. The external tag reader 27 is used administratively to assign unique tags to their associated assets or asset control devices and may also be used to identify authorized users. The form of the external tag reader is such that its placement and use for its intended purposes is suitable. See FIGS. 3–11.

User Identification Device

Users are identified to the system by typing a user name into the controller computer (not shown), applying a RFID badge or tag, or through the use of some other identification means, including biometric devices such as thumbprint, fingerprint, or retinal scanners. The device that facilitates this identification is referred to herein as the user identification device. The external tag reader 27 may be used for this purpose where uniquely assigned RFID tags or badges are issued to authorized users (see FIGS. 3–11). Optionally, the system may also require entry of a user specific password. A user identification device must be located in the vicinity of the security enclosure(s) it serves; the system will not allow "remote" access to a security enclosure.

Software

The system software, generally resident in an attached controller computer and also in the scanner and reader board processors, contains a number of elements which can be operated in a wide variety of configurations. The scalability of the architecture allows many physically varied installations as well as the management of the system in different ways. Scanner and reader software programs reside on the scanner and reader boards respectively and perform the functions described above. Controller software programs resident in the controller computer may manage multiple readers or groups of readers in different physical locations and the input and display devices of the user interface at the location of the security enclosures. Host application software, preferably resident in the controller computer, maintains a data base of all assets and their associated unique ID's, the complete history of their use, the complete history of user access, displaying and printing reports and analyses of asset usage, etc. FIGS. 16–19 include schematics, firmware and application software, and operational flow charts illustrating a preferred functioning of the software.

RFID Primer Notes

Of the variations of radio frequency identification technologies, the system specifically uses passive low-frequency technology. The transponders 14 embedded in the asset tags 11 have no battery or other power source but are "wakened" by a transceiver 23 within a security enclosure 21 issuing a signal that contains sufficient power to cause the transponder to respond by transmitting its unique ID.

Since communication is radio frequency, the system does not require contact between the transceiver and transponder to function. The required distance between them is a function of the signal strength, environmental conditions, and other factors. Control of the distance to keep it relatively small is important to minimize signal collision, where a single transceiver may activate and obtain responses from multiple transponders. These situations can sometimes be managed through sophisticated software. This invention eliminates collision by its careful design of the RF communications parameters. See the drawing of FIGS. 3–11 showing the relative positioning of the tags 11 containing transponders 14 directly above the transceivers 23 on the scanner board 22, a configuration that minimizes signal collisions.

The transponders are protected by embedding them in the plastic tags and sealing them in their tags with epoxy. They are then waterproof, relatively heat and cold resistant, and safely attached to the asset/device because the tag itself is strong and durable.

Software Functions

Notes on Software

Since the software resident in a controller computer of the system is Windows-based, navigation on user interface screens may be done with a mouse, but may also be done with only keyboard strokes. Most installations are expected to avoid using a mouse.

Most fields of the user interface are associated with pre-defined lists of responses and "auto fill" as users begin to type characters—when the selected response is displayed and highlighted in the field, the user may select it without additional typing by moving to the next entry field. Fields also have drop-down lists of the choices which may be accessed and selected with a mouse, if available.

Assigning Tags To Assets

A function of the host software program allows an authorized administrative user to add an asset to the system by importing or entering the description of the asset and associating the asset with a unique asset tag by "touching" the asset tag to an external tag reader and physically attaching the asset or asset control device to the asset tag. In the case of a car lot, for instance, the administrative user might enter the make, model, color, and other information about the vehicle associated with a car key to be attached to the asset tag. The asset is then accountable to the administrative user until it is returned to a security enclosure.

Removing An Asset Tag

The system controller computer displays a default "log-in" screen—no system function may be initiated by a user without first being confirmed as an authorized user. The user presents a badge or fingerprint if such user identification option is attached to the system or types his user name and, optionally, his password. The system displays a message if the user ID or name and password do not match in the system's authorization table which allows specified classes of users to perform specified functions. The authorized user may repeat his attempt to log in. The system records all rejected log-in attempts for possible future analysis of security breaches.

The user removing an asset (e.g. a key) selects from 2 options, QuickKey or FindKey, which are described as follows:

QuickKey—the user enters one or more asset numbers (such as vehicle stock numbers) directly on the log-in screen. The system displays the "check out reason" screen containing a pre-defined list of reasons for removing keys. The user selects a reason for each asset requested. The system displays all assets currently assigned to the user's accountability, opens the enclosure, displays the "enclosure open" screen, and illuminates one of the selected asset tags by lighting the LED directly beneath the tag. On removal of the illuminated tag, the system illuminates the next selected tag, if any. The user may at any time remove other asset tags which have not been requested. Each asset removed, whether or not requested on the log-in screen, is added to the user's accountability display. The system displays messages for cases in which an asset is currently checked out to another user or the asset ID is invalid. For each asset tag removed, the user's accountability display includes the asset ID, asset description, and reason and/or location. While the enclosure is open, the user may return asset tags which have been removed in prior or the current access period. In that event, the display requests the location of assets returned per below.

FindKey—Users who do not know the asset numbers of assets to be checked out may use the system's search engine by leaving the asset number field on the log-in screen blank. The "search" screen is displayed which allows the user to select one or more pre-defined asset description fields. The system performs "and" logic operations when the user selects multiple description fields to search and "or" logic operations for any multiple choices for each description field. As the user refines search parameters, the display updates a summary view of the search parameters and the number of matching assets. On completing the search definition entry, the system displays the "check out reason" screen for each asset selected and subsequently displays the "drawer open" screen, opens the drawer, and Is illuminates one of the selected asset tags. An example of a search for a car dealership would be to find all "new Mustang convertibles" (using 3 predefined description fields of new/used, model, and body type)—if there are 5 matching vehicles in inventory, the appropriate key tags will be lighted illuminated.

Returning An Asset Tag

The user may choose to return an asset tag on the log-in screen. The system displays the enclosure open screen and opens the enclosure. As each asset tag is returned to any open position in the available arrays, the system detects the returned tag and displays the "location" screen from which the user selects a response indicating the location of the asset (e.g. a car corresponding to the returned key) at the time of the tag return. While the enclosure is open, the user may remove other asset tags (which prompts the reason screen and adds the asset to his list) or may initiate either of the QuickKey or FindKey functions. The system displays a message if any tag is returned which is not currently assigned to an asset in the system.

Retiring An Asset

A function of the host software program allows properly authorized administrative users to "delete" assets from the system. This may be done, for example, when a car associated with a key on an asset tag is sold. While retiring the asset functions as a deletion so far as the asset tag is concerned (the asset tag may then be re-assigned to another asset), the system archives the history of the retired asset for further use and analysis.

Administrative Functions

In addition to adding and retiring assets, authorized administrative users may add and delete users along with assigning their badge or tag ID's, authorization classes, and passwords. Administrative users may display or print standard reports defined in the system or use the adjunct report generation function to create reports. Administrative users maintain the pre-defined lists used in the system for user selection in auto-fill and drop-down menus.

System Administration Functions

One or more authorized system administrators may alter the system configuration, change the field definitions used for pre-defined lists, and modify other system functions to account for changes over time in the system environment.

Preferred Hardware Implementation

Figure 1A:
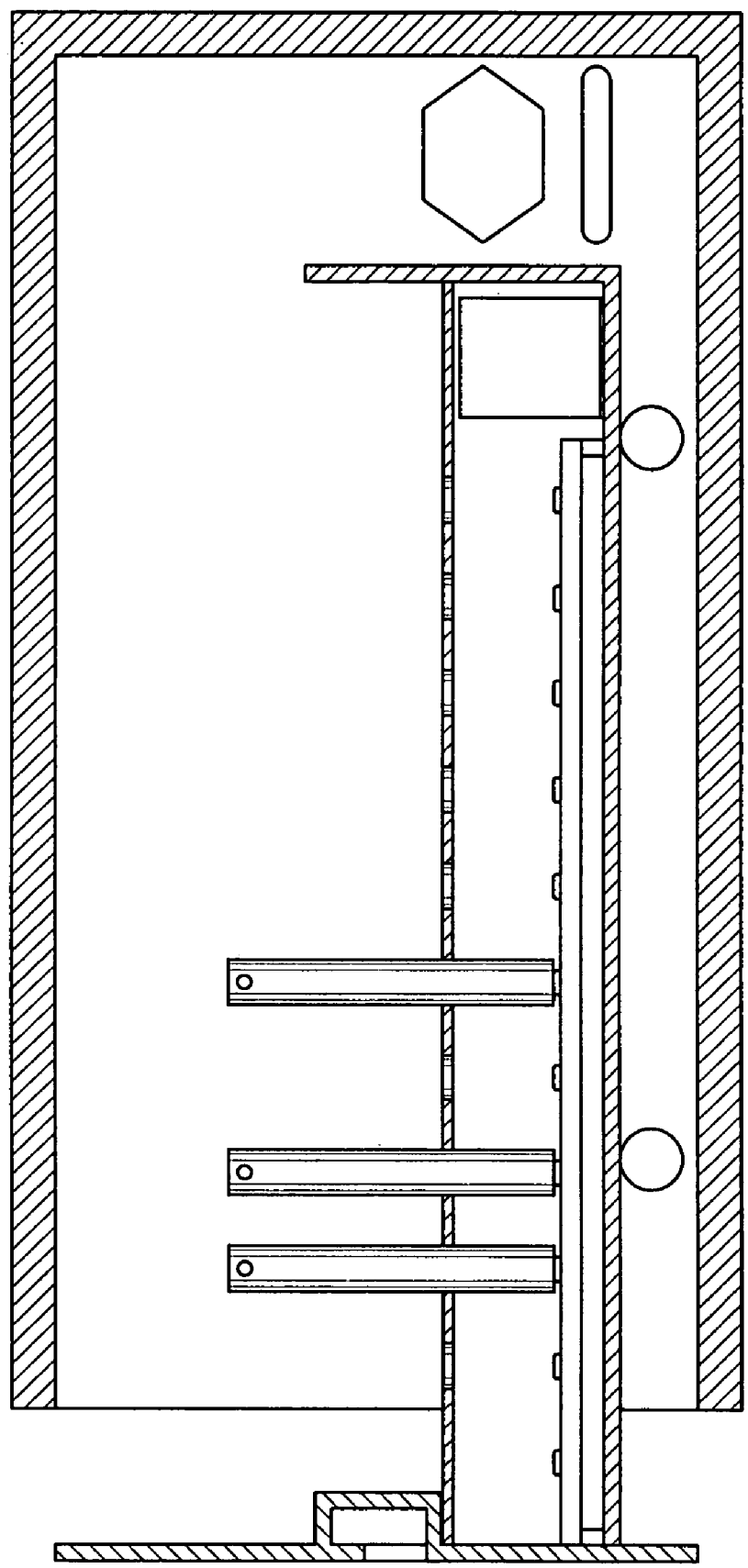
FIG. 1A is a cross-sectional view of an asset management system that embodies principles of the invention in one preferred form.

The preferred hardware implementation of this invention is targeted at vehicle dealerships, vehicle fleet operators, and multi-family housing managers. The assets to be managed are vehicle keys and remotes or apartment keys and thus the asset tags are generally referred to when describing this preferred embodiment as "key tags."The enclosure is a an openable security drawer made from 16-gauge steel with an array of 256 key tag locations. FIG. 4 illustrates a preferred drawer embodiment of the enclosure 21 with the drawer opened to reveal several key tags 11 stored therein. A top panel 17 in the drawer is formed with an array of receptacles 18 sized to receive and hold key tags 11 with the tops of the key tags protruding upwardly. As best seen in FIG. 1A, the receptacles 18 are positioned to align with and overlie a transceiver and LED pair, which reside on the scanner board 22 beneath the top panel 17. In this way, key tags 11 rest atop LEDs 24 and transceivers 23 when stored in the drawer so that the RFID tags can be read and the key tags illuminated as necessary and required.

Drawers

Other drawer configurations are possible, including a "mini" drawer with for storing approximately 150 tags and a "combo" drawer that may be used to control license plates as well as keys.

An enclosure also may be a locked room and arrays of scanner boards can be mounted on walls or in filing cabinets, etc. to control assets such as expensive electronic devices or documents/files. An example of other enclosure designs is the control of hand- or wrist-mounted bar code scanners worn by employees of package delivery firms.

Tags

Tags are preferably about 6.5" long plastic rods into which a transponder is inserted in one end and sealed with epoxy. The top end is provided with an attachment tab (13 in FIG. 1) or, more preferably, drilled for a key ring or rivet, as shown in FIG. 8, with which to attach the keys and remotes, generally along with a printed tag or card with asset description information. The preferred key tag configuration uses a "hook" shape so keys hang down when attached and employs a détente on the transponder end of the key tag and corresponding cam in the drawer to provide a "click" feel when the key tag is properly inserted. Two unique properties of the key tags are:

RFID—There is no known use of RFID technology in the object tracking field. One of the tag advantages of RFID in the present invention is its non-contact read capability which allows opportunities to protect the drawer electronics with a mylar sheet and eliminate wear and tear failures sometimes associated with contact type key tags.

Light pipe—The tags also function as light pipes which allows the system to indicate the locations of selected tags to the user without using an x-y grid position for which the user must search on a silk-screened drawer insert. More specifically, as best illustrated in FIGS. 1, 1A, 2, and 12, the key tags 11 are made at least partially of a transparent or translucent plastic material that is chosen for its ability to transmit light along its length. When a key tag in a drawer is to be identified to a user, the LED directly beneath the tag is lit or flashed. The light from the LED is transmitted upwardly through the tag to its top, from where some of the light emerges. Some of the light also is emitted from the sides of the key tag (unless, of course, the sides are painted or otherwise covered). The result is that the key tag generally is illuminated by the LED beneath it and is readily visible to a user, who can then remove the lighted key tag and its attached key from the drawer.

Scanner Boards

Figure 12:
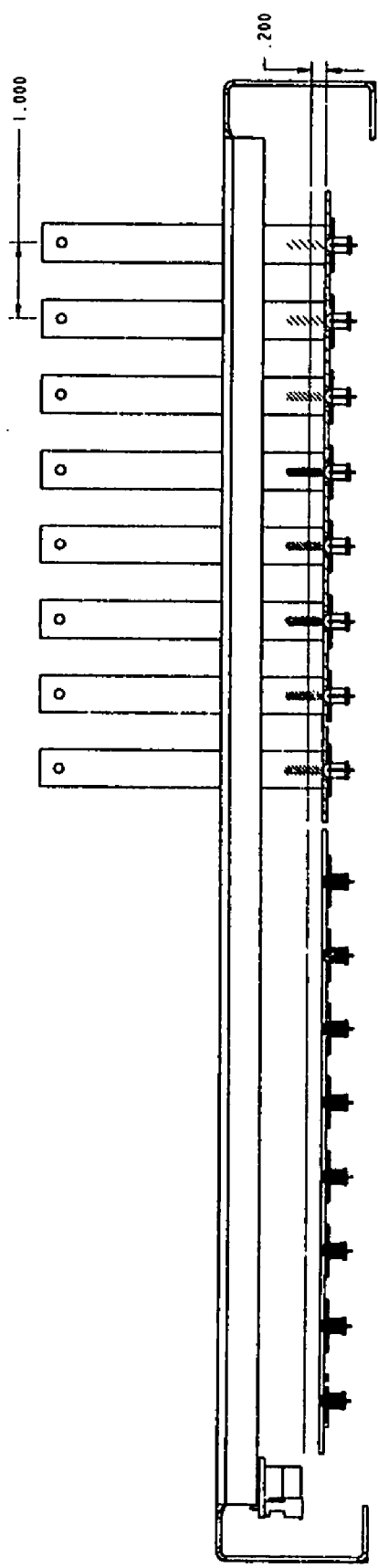
FIG. 12 is a side elevational view illustrating the positional relationship between the top panel, the scanner board, and a plurality of asset tags according to the invention.
Figure 13:
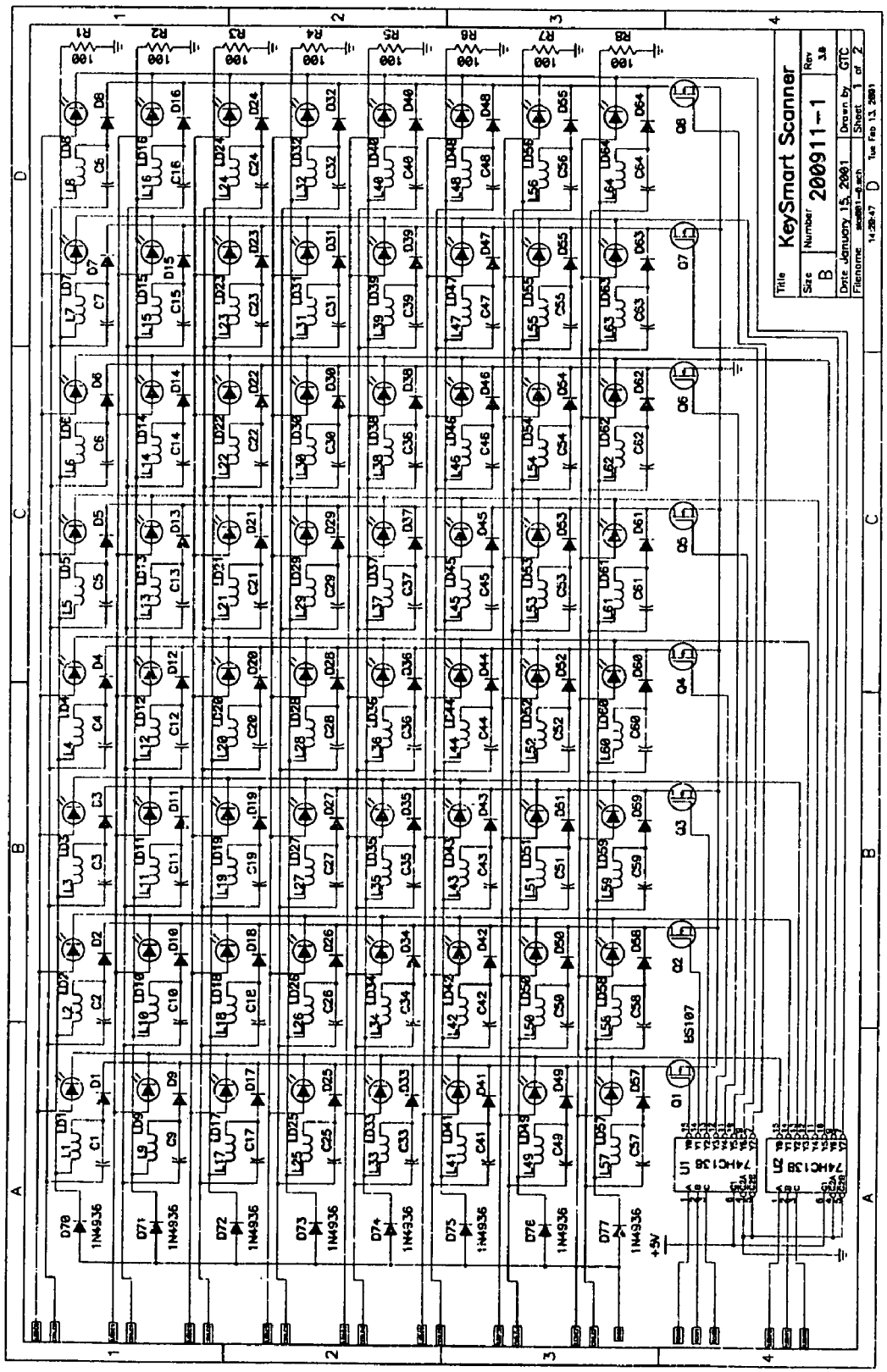
FIG. 13 is an electronic schematic of a preferred embodiment of a scanner board according to the invention.
Figure 14:
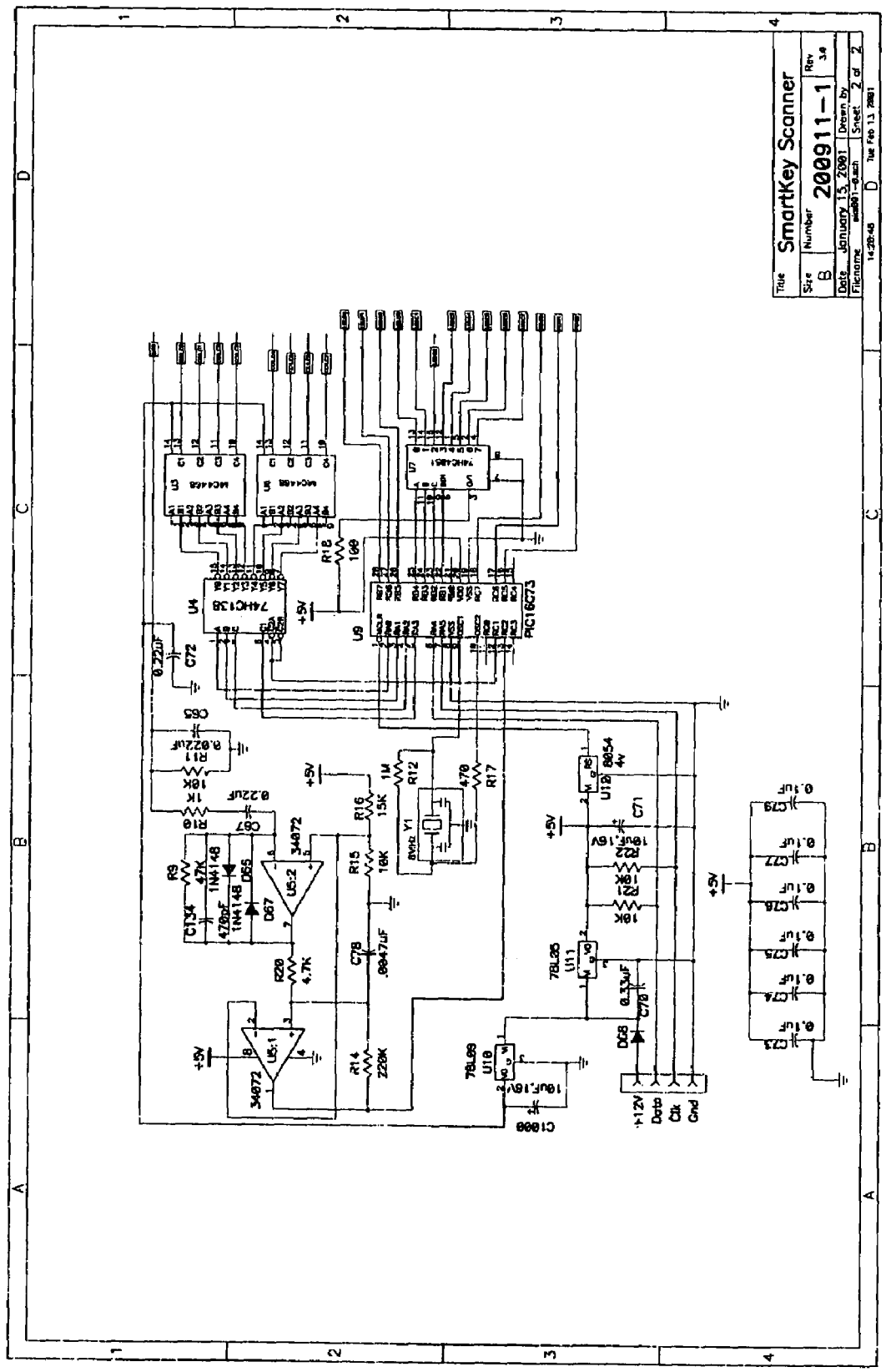
FIG. 14 is an electronic schematic illustrating on-board electronics of the scanner board.
Figure 15:
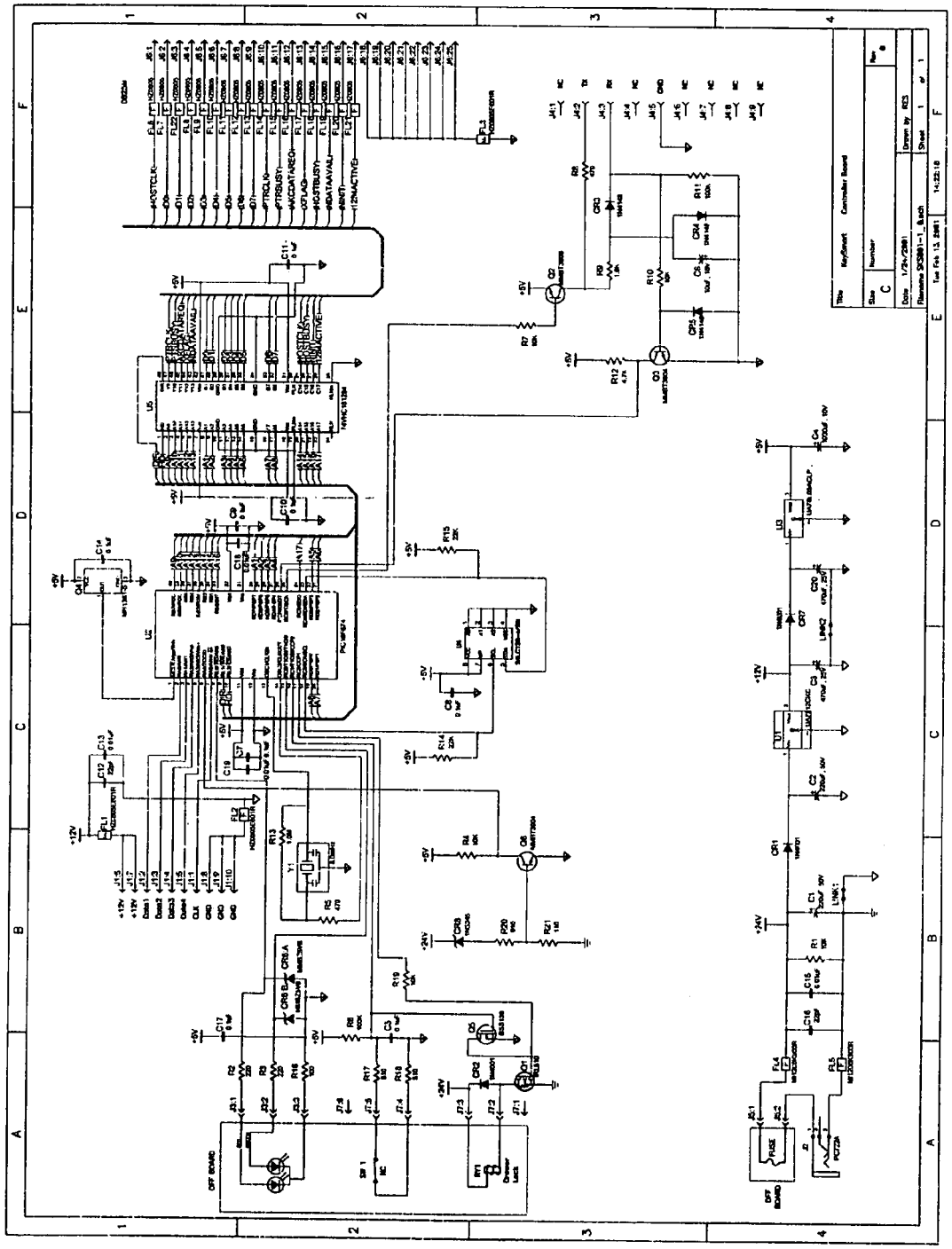
FIG. 15 is an electronic schematic of a preferred embodiment of a reader board according to the invention.
Figure 16:
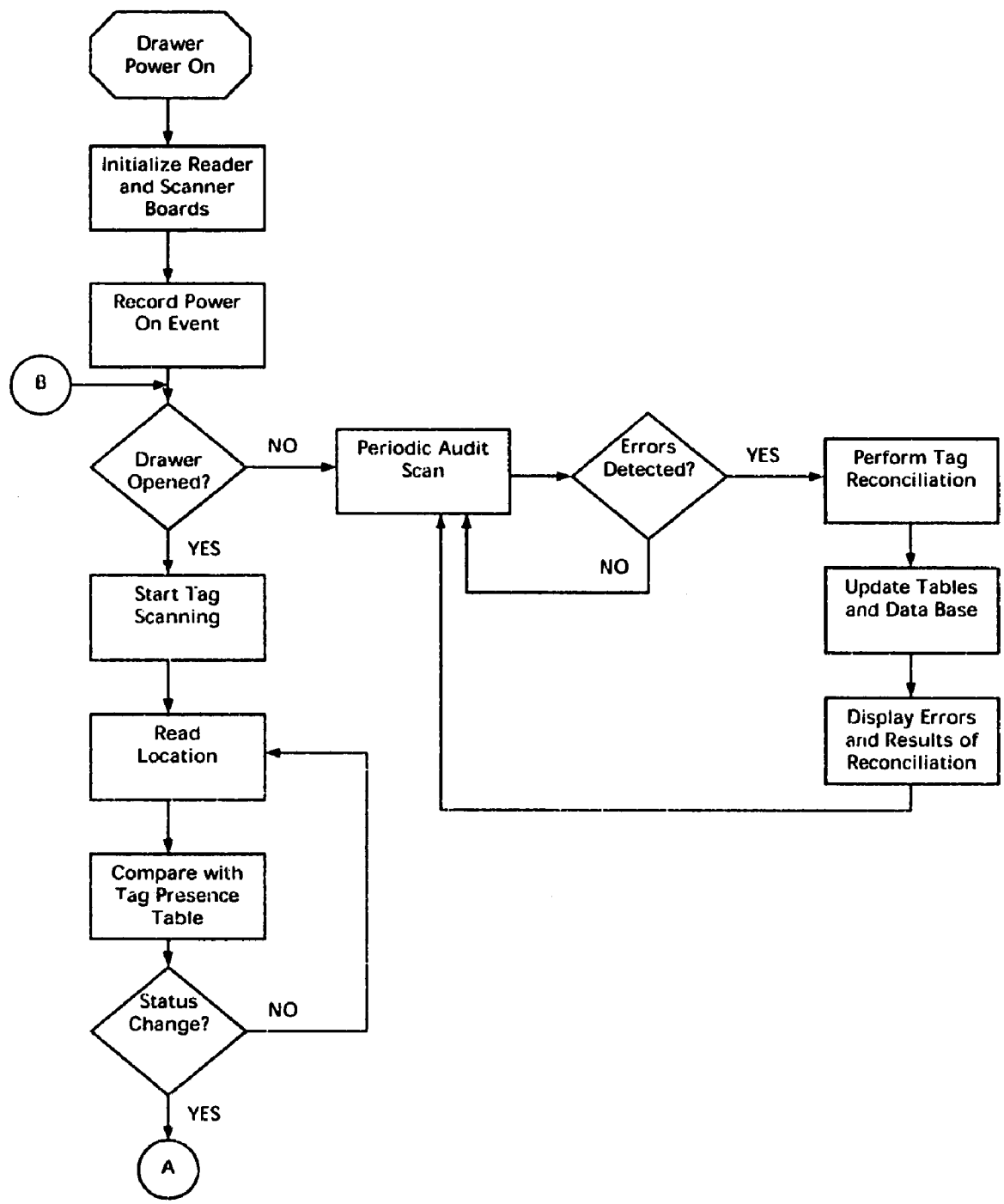
FIGS. 16–19 are functional flow charts representing software in a controller computer for carrying out the functions of an asset tracking management system according to a preferred embodiment of the invention.
Figure 17:
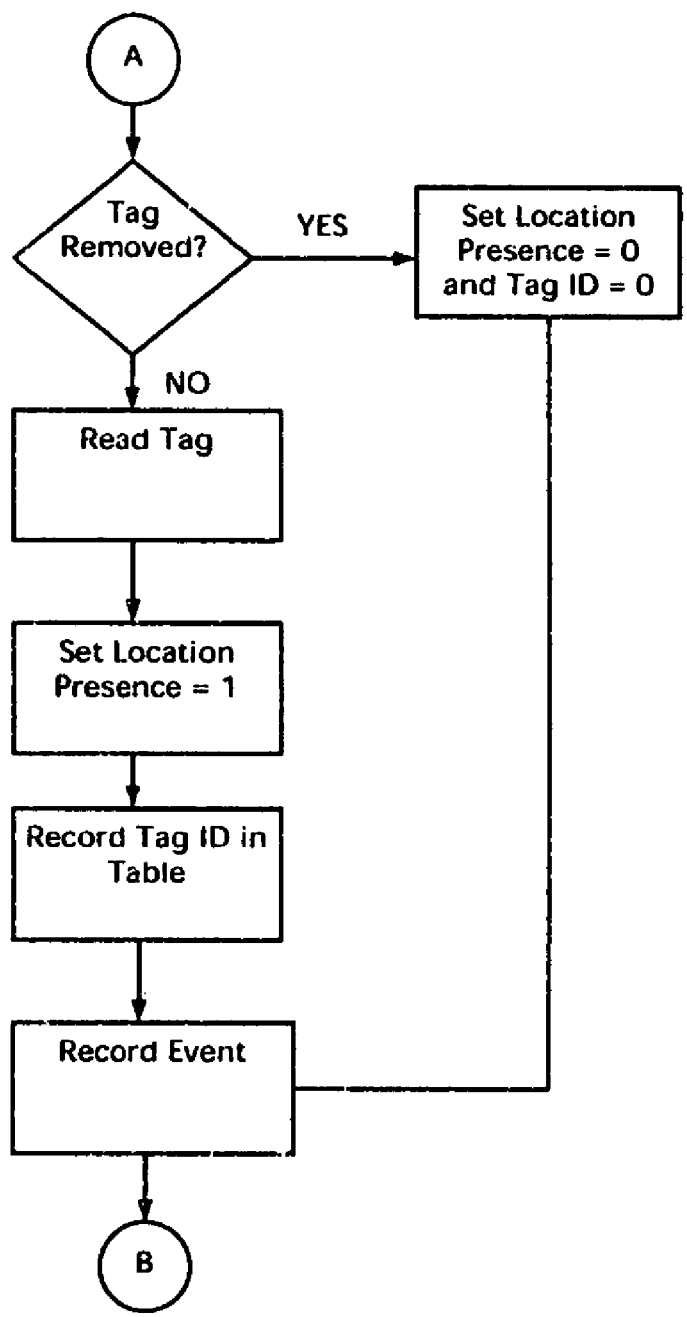
Figure 18:
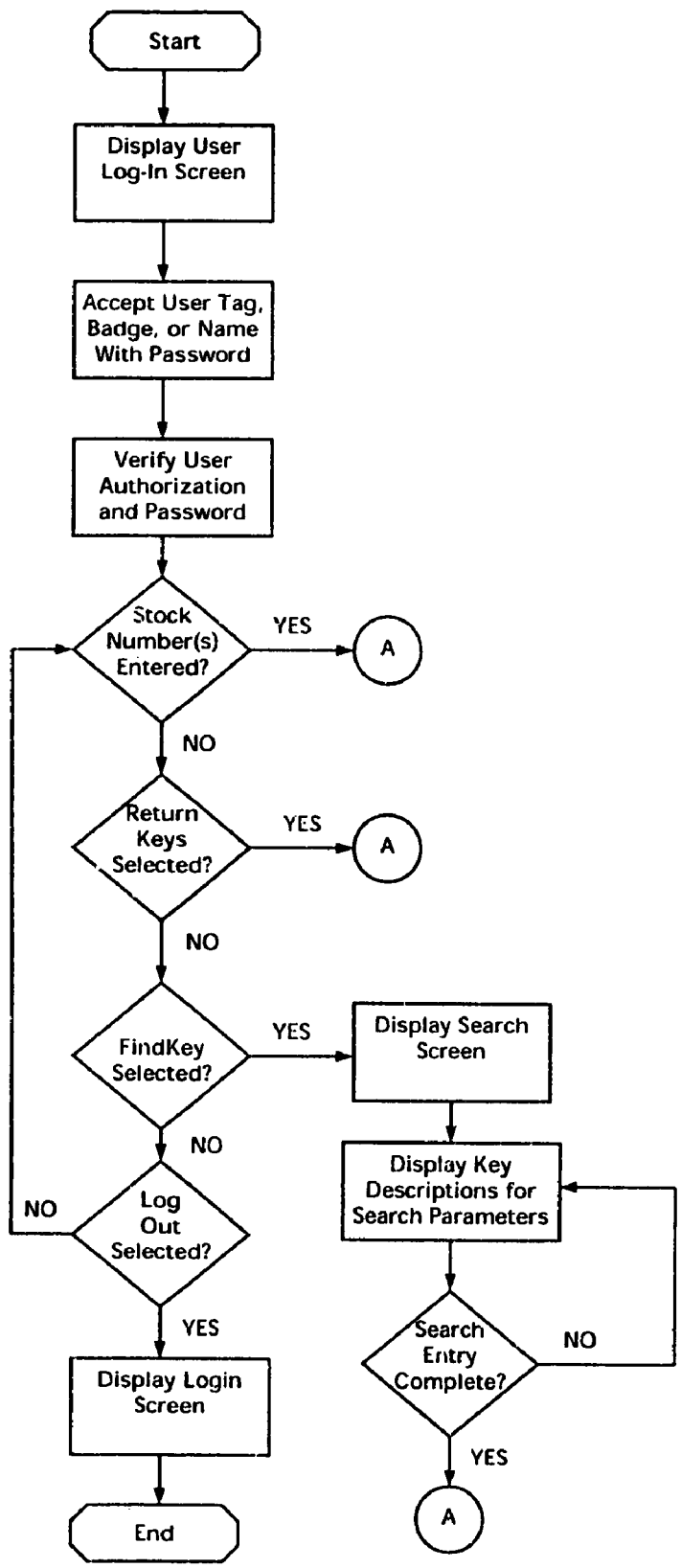
Figure 19:
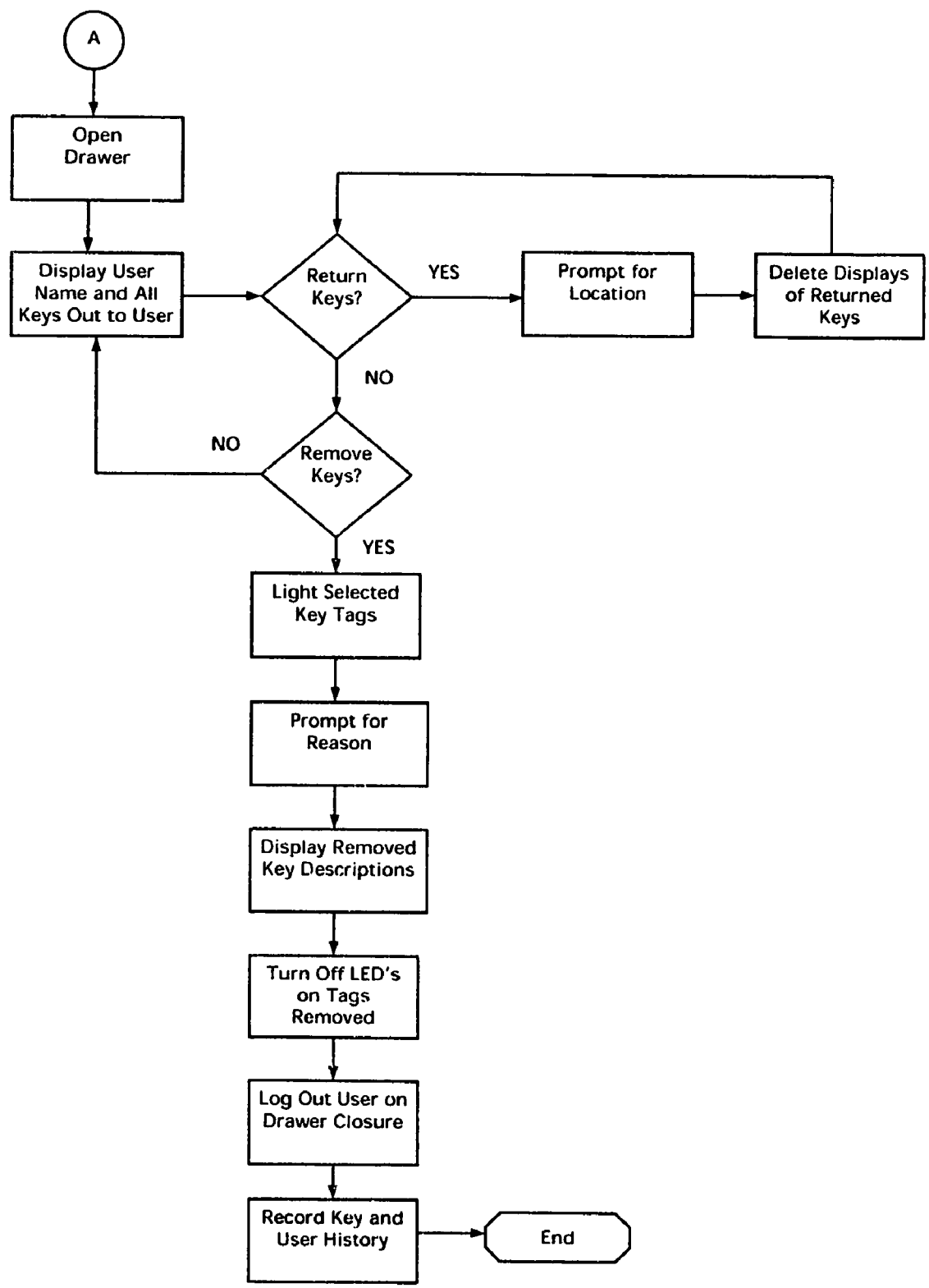

FIG. 12 illustrates one embodiment of the interior components of a drawer of this invention. Here, 4 scanner boards A, B, C, and D. (only A and B being visible in FIG. 12) each with an 8×8 array of transceivers 23 and their associated LEDs 24 are connected to 4 plastic inserts (not shown) and a drawer-size metal cover 25. Key tags 11 are shown inserted into some of the receptacles in the metal cover 25 and these tags align with and overlie corresponding LEDs on the scanner board below for selectively illuminating key tags, as described above. Cables, also not shown, are attached to a connector. In use, the scanner board assembly shown in FIG. 12 is inserted into a drawer and a cable is attached from the connector to the reader board attached to the inside back of the drawer cabinet. The scanner boards are surface mount assemblies with a "bobbin" assembly for each transceiver/LED pair. Each scanner board also carries a processor (EEPROM) storing a small Assembly language program with other electronics.

A unique property of the RFID design in the present invention is that a large number of transponders in a small space (i.e. within the confines of a drawer) can be reliably read by corresponding transceivers on the scanner boards without signal collision. Even engineers familiar with RFID would say this is unexpected—the "normal" implementation is to create a relatively strong radio frequency "field" through which transponders pass, are activated, and can be read. Such an implementation is used in many active higher-frequency RFID applications (e.g. toll roads) and in some passive applications under development (e.g. grocery store checkout). An alternative "normal" implementation for the present application of object tracking is to create a single "read field" in a drawer or other enclosure whereby one transceiver communicates with the transponders in all of the key tags in the drawer. However, such an approach requires signal collision detection and correction that is probably beyond the capabilities of current software and presents other problems associated with the size of the field (for example, the scanner may read tags which are located outside the closed drawer). The use of metal in the drawer and the presence of metal in the keys and remotes also present technical scanning issues for defining the reading environment using such an approach. Thus, the multiple low power ultra short range transceivers in the present invention each being located immediately adjacent the bottom of a key tag containing a single transponder to be read, is a unique solution that avoids substantially all of the problems with other approaches.

Reader Boards

The reader board assembly 26 (FIG. 10 and the schematic of FIG. 15) manages power (from an external "brick" power source), drawer functions such as open, close (de-energize solenoid), lock, and unlock. The reader board 26 also controls an external status LED that can be lighted green, red, or both to indicate status such as power on. The reader board includes a processor (EEPROM) and memory for the presence/absence table, tag ID table, and event queue and is programmed to perform the scanning functions described above.

Drawer Interface

The drawers use a modified parallel interface to a PC (personal computer), which functions as the drawer or drawer cluster controller. The parallel protocol is modified to include drawer ID so that up to 8 drawers may be daisy-chained to a single parallel PC port. The reader board programs ignore any command which does not include its drawer ID.

Scalability

The system of this invention is designed to be flexible in its configuration and operation. While the function and location of the scanner and reader board "firmware" is not affected, other software components may operate differently as detailed in the scenarios outlined below.

Multiple Drawers

While an entire system may be a single drawer and a single PC, up to 8 drawers may be connected on the parallel port. In these single-cluster systems, the controller and host software runs on the PC and a printer, an external reader, and an optional user identification device. The software functions described above are somewhat complicated by the need to open the drawer(s) which contain the requested tags. They must be opened one at a time. Tags can be returned to any drawer in the cluster, normally according to which has the most unused positions.

Multiple Clusters/Network Configuration

In larger car dealerships, for example, clusters of one or more drawers each will may be installed in different locations—new car, used car, get ready department, service department, etc. In these cases, each cluster will be controlled by a PC (or integrated controller) which in turn is connected to a new or existing LAN. One PC on the LAN will then serve as the host and coordinate activity of the clusters. All LAN users who are authorized may access the host software for reports, etc. at their LAN workstations. LAN's with remote access capability could also allow remote access to host software functions. One or more external tag readers can be attached to any LAN workstations for administrative users to add assets and employees. User identification must always be performed at the cluster location.

Integrated Controller

An alternate configuration of the preferred embodiment is obtained by eliminating the current cluster PC in favor of an integrated, dedicated PC containing only the specific capabilities required by the system controller functions. The mouse, keyboard, and CRT in such an embodiment is replaced by a touch screen. With integrated controllers, a separate LAN-connected host PC may be required.

Web Configuration

Host software functions may be executed from the web. In multi-site environments (for example, car dealers with multiple stores), the system can make all asset information available and can perform additional functions related to summarizing activity at all sites.

EXAMPLE SYSTEM—KEYSMART

The following is a more detailed description of an example system, referred to herein as the KeySmart System, that embodies principles of the present invention in a preferred form.

System Description Keysmart Asset Management System

1. Overview

The KeySmart Asset Management System is a product that allows the consumer to monitor assets moving into and out of central location. The function of the System is to 1) hold any user of the asset accountable while he has the asset checked out; and, 2) decrease the time it takes to locate an asset. The assets of choice for initial product rollout are keys. These assets will be secured in a drawer; and any activities concerning the keys will be controlled via computer software.

The primary target markets for KeySmart are auto dealerships, apartments, office buildings, schools, vehicle fleet owners (rental car agencies, trucking companies, etc.), valet service, etc.

2. Definitions

Cluster: Node containing PC, UPS (as needed) and one or more drawers.

System: Complete package including Cluster, Master Control Software, and any other software module.

Drawer: Consists of enclosure that houses the drawer and the drawer.

RFID components

An antenna or coil. An antenna is used to transmit information from a reader to a tag, and to receive information sent by a tag. The size and format of an antenna will reflect the specific application, and may range from a small circular coil to large planar structures suitable for access control systems.

A transceiver (with decoder). A "reader" is an electronic unit that transfers information to and from one or more tags (it should be noted that the term reader is used interchangeably to mean both a read only and read/write unit). The size and features of a reader may vary considerably, and it may operate in isolation, or be connected to a remote computer system.

A transponder (commonly called an RF tag) that is electronically programmed with unique information. A tag is a small electronic circuit, usually encased in glass or plastic, which in its simplest form contains a unique identification code that may be "read", without contact or line of sight, by suitable electronics. More sophisticated tags may also store information generated by the user, again without contact or line of sight.

3. Product Evolution Plan

| | |
|---|---|
| Version 1.0 | One cluster containing one drawer |
| Version 1.1 | One cluster containing multiple drawers |

-continued

| 3. Product Evolution Plan | |
| --- | --- |
| Version 1.2 | Multiple clusters connected on a network |
| Version 1.3 | System is web enabled |
| Version 2.0 | Embed PC functions |
| Future | Higher security features (biometrics, video surveillance); Ability to locate tag on premise; Increase the density/amount of tags per drawer |

4. System Requirements

Should be able to easily handle different types/sizes of assets

Building block type technology to go from 50 assets up to 2500 assets

Building block technology must allow different entry levels of security

5. Main Components

| 5.1 Cluster Controller - Personal Computer Requirements: | | |
| --- | --- | --- |
| Monitor | (?) MHz Processor | (?) Disk Space |
| Keyboard | (?) Memory | |
| Keypad | RAM | |

5.2 Peripherals 5.2.1 Single RFID Antenna/Reader

Interface: Connection via USB or RS-232C

Certification: FCC Class B/UL/CSA

The single RFID antenna/reader may be used to 1) identify the individual who is requesting access to the system; or 2) assign new assets to tags; or 3) allow customer the ability to perform administrative functions on a remote PC.

5.2.2 Drawer(s)

Interface: Connected via USB.

Certification: FCC Class B/UL/CSA

Contents: Three sizes depending on the number of tags: 50, 100, or 300 tags.

Requirements:
  Status LEDs on drawer
  Spring loaded?
  Provides mounting points for RFID equipment in drawer
  Manual release
  Physical size. ~19" to 23" wide×10" high×~27" to 30" deep
  Stackable
  Power requirements: to be determined. Either external power brick or internal power supply
  Drawer ID to differentiate between multiple drawers FIG. 4 shows a typical drawer.

5.2.2.1 Physical Characteristics

The enclosure will house the assets in drawer(s). It will be made of 16 or 18 gauge steel and contain one or more drawers. The drawers will be capable of full extension, riding on steel ball-bearing drawer slides, to allow access to entire contents of drawer. The construction of the enclosure should "discourage" unauthorized entry but need not be "burglar-proof"—i.e. it's not a safe but it should not be violated without damage.

There will be two methods of opening the drawer 1) manual release with a key (in case of power outage); and 2) electronic via solenoid. Under power, the System will ensure that only one drawer can be opened at a time. Access between drawers will be discouraged.

5.2.2.2. Plastic Insert

Function/Requirement:
  hold the tags in position—right side up;
  provide detent for user feed back to ensure tag fully seated
  keep tags, not properly inserted into the receptacle, away from the RFID antenna
  fix the read distance of the tag to the antenna
  as needed, provide a foundation for attaching labels/demarcations within the drawer
  able to hold the weight of the assets (max. 30 lbs.)
  contains integral receptacles to accept RFID tags
  should keep liquids and/or debris from falling to the bottom of the drawer The plastic insert sits on the bottom of the drawer above the RFID antenna and LED array.

5.2.2.3 Release

Function/Requirement:
  Solenoid for latch to open the drawer. Includes a state switch to determine if the drawer is "open" or "closed".

5.2.2.4 Tag

Function/Requirement
  Includes the RFID tag
  Each RFID tag should have a unique ID
  Diagnostic functions (?)
  Environmentally sealed
  Hook or eyelet for attaching assets (keys)
  Rugged
  Low cost FIGS. 1, 2, and 8 illustrate typical tags.

The tag will consist of a simple RFID chip that will be energized by the magnetic field created by the antenna closest to it. Installed on the circuit board are the LED's and the antennas. Each hole has an LED to indicate to the user that the transponder inserted in that slot is being enabled. If the controller stops the polling process at any individual transponder, that LED will remain lit. The LED is located dead center in the hole and beamed upward to cause the transponder to act as a light pipe. When the transponder is "flagged" the LED causes the transponder to glow and be easily identified for the user to pull out.

5.2.2.5 Reader/Antennae

Function/Requirement:
  Controlled read range should be <2 cm
  FCC Class B
  Read time for fully loaded drawer (300 tags) should be less than or equal to 2 seconds
  Detect rogue tags
  Power
  Continuous reading capability
  Interface to USB micro controller Program mode, ability to add a new tag/asset to the system within existing system in a timely manner.

A printed circuit board (PCB), containing antennae and LED's (light emitting diode) will be located on the inside bottom surface of the drawer. There will be one antenna and one LED per asset slot. The LED will blink on command and act as a visual asset locator for the user. The RF antenna system will consist of approximately 96 individual antennas arranged in an X-Y matrix. Each antenna will be polled by the reader electronics and if a transponder is present, it will be read and the data sent to a PC or other controller for inclusion into a database.

The antenna system will be made up of smaller antenna boards of 8×12 antenna's. These boards can be stacked in various arrangements to make up different size drawers. Details will be worked out at a later date.

The RFID implementation must distinguish between tags in a drawer from tags in other, stacked drawers and/or tags near or on top of drawers and security enclosures. In addition, tags should be properly placed into plastic into plastic insert receptacles in order to be read. For these reasons, the read range is limited to <2 cm above the antenna PCB.

Each drawer should be the highest tag capacity practical for (a) the interrogator to accurately, reliably, and quickly identify all tags and (b) the grid design to organize tags.

5.2.2.6 Drawer Device Drive Module

Software to provide application programming interface to hardware.

Functions:
Open drawer
Drawer state
Scanning tags (full count)
Tag Diagnostic (light all tags to ensure tag function)
Tell the LEDs beneath the requested tag(s) to blink 5.2.3 Uninterruptable Power Supply An optional uninterruptible power supply can be provided in order to provide power to the System during power outage.

6. Proposed Method of Operation 6.1 System Operation (find key)

Assume: Drawer is loaded with tags (anywhere from 0 to 300 tags at any given time). User is at an enclosure that contains the asset.

User inserts his ID "key" and enters his PIN.
He queries the asset monitoring system for the location of the key.
The monitoring system identifies drawer and activates RFID reader/antennae (locator) in drawer to verify asset.
The reader sends a signal to the RFID tag and starts the LED blinking.
The monitoring system unlocks the drawer.
The user visually located the tag and removes it from the drawer.
The reader informs monitoring system of requested tag(s) removal (and any other tag that is missing) in real time.
The user closes the drawer.
The monitoring system verifies drawer closure and deactivates the electronics in the drawer.
The monitoring system logs the transaction, charges user for assets(s) checked out.

6.2 System Operation (replace key)

Assume: User is at an enclosure that can hold the asset.
User inserts his ID "key" and enters his PIN.
He queries asset monitoring system for drawer space to return key.
System identifies a drawer, activates the RFID reader, and unlocks it.
User inserts tag into an empty receptacle.
The reader informs monitoring system of tag(s) return in real time.
The user closes the drawer.
The monitoring system verifies drawer closure and deactivates the electronics in the drawer.
The monitoring system logs the transaction, records return of assets(s)

The present invention includes that contained in the appended claim as well as that of the foregoing description. Although this description has been described in its preferred form with a certain degree of particularity, it should be understood that the present disclosure of the preferred form has been made only by way of example and that numerous changes in the details of construction, combination, or arrangement of parts thereof may be resorted to without departing from the spirit and scope of the invention as set forth in the claims.

Now that the invention has been described,

What is claimed is:

1. An asset management system comprising:
a plurality of asset tags each made of material that transmits light;
a security container having an interior at least partially defined by a back panel;
a top panel disposed within said security container adjacent the back panel, the top panel defined by an outer surface and an inner surface and having a plurality of open receptacles each for receiving and storing an asset tag;
a plurality of light emitting diodes (LEDs) positioned in said security container and enclosed between the top panel and the back panel, each LED being positioned below an open receptacle and aligning with an asset tag located in said receptacle; and
a controller coupled to said LEDs, said controller being programmed to identify a selected asset tag by lighting the LED aligned therewith, the selected asset tag being illuminated by light from the LED to identify its location visually to a user.

2. An asset management system as claimed in claim 1 and wherein said asset tags are made of plastic.

3. An asset management system as claimed in claim 1 and wherein said security container is openable.

4. An asset management system as claimed in claim 3 and wherein said security container is an openable drawer.

5. An asset management system as claimed in claim 1 and further comprising a scanner board in said security container, said LEDs being located on said scanner board.

6. An asset management system as claimed in claim 1 wherein said asset tag is defined by a first end and a second end, wherein said first end is positioned below the top panel adjacent said LED when said asset tag is seated in a receptacle.

7. An asset management system as claimed in claim 1 and further comprising an identification tag in each of said asset tags, each said identification tag storing a identification code uniquely associated with the corresponding asset tag, and at least one reader in said security container for detecting the identification codes associated with asset tags in said security container, said reader conveying the detected identification codes to said controller.

8. An asset management system as claimed in claim 7 and wherein said at least one reader comprises a plurality of readers, each reader being associated with a receptacle and positioned to align with an asset tag located in said receptacle for reading the identification code associated with said asset tag.

9. A method of identifying the location of a selected key tag stored in a key management system and made of a light transmitting material, said method comprising the step of
positioning a light source internally within the key management system below a panel configured to receive a key tag;
inserting a key tag into the panel so that a first portion of the key tag extends below the panel adjacent the light source a second visible portion of the key tag extends above said panel;
activating the light source aligned with the key tag to project onto said first end of said key tag,
utilizing said key tag to transmit light at least partially along the length of the key tag to the second visible portion of the key tag to illuminate the second visible portion of the key tag making the key tag identifiable to a user.

10. The method of claim 9 and further comprising the step of flashing the light source.

11. The method of claim 9 and wherein the light source is an LED.

12. A system for tracking keys comprising:
a key tag to be associated with a key and made at least partially of an optically transparent material;
a security container in which is defined an internal compartment;
a receptacle in said security container, said key tag configured to fit in said receptacle;
a light source positioned within said internal compartment in said security container and below said receptacle, said light source positioned to project light into said key tag when said key tag is seated in said receptacle and said light source is activated; and
a controller operatively coupled to said light source, said controller being programmed to identify said key tag visually to a user by activating said light source to illuminate said key tag.

13. A system for tracking keys as claimed in claim 12 and wherein said light source comprises and LED.

14. A system for tracking keys as claimed in claim 12 and further comprising a readable identification code in said key tag and a reader in said security container, said controller being operatively coupled to said reader for receiving said identification code to identify said key tag.

15. A system for tracking keys as claimed in claim 14 and further comprising:
a plurality of said key tags each to be associated with a key and each being made at least partially of an optically transparent material;
a plurality of said receptacles is said security container, said key tags configured to fit in said receptacles;
a plurality of said light sources in said security container, each light source corresponding to one of said receptacles and being positioned to project light into a key tag when said key tag is in said receptacle and said light source is activated; and
said controller being operatively coupled to said plurality of light sources and being programmed to identify a key tag in a receptacle by activating the light source corresponding to said receptacle to illuminate said key tag.

16. In a key management system wherein a plurality of key tags are disposed to be received in a panel having a plurality of open receptacles in a security container and wherein each key tag, when received in a receptacle, has a first portion that extends below the panel and a second portion that extends above said panel, the improvement wherein said key tags are light pipes and wherein said security container houses a plurality of light sources below the top panel and where each light source is aligned with one of said receptacles, each light source being positioned to emit light into the first portion of a key tag located above the light source in the receptacle associated with the light source to illuminate the second portion of the key tag and identify it visually to a user.

17. A key tag for use in a key management system, said key tag comprising a tubular body having a first end and a second end and a bore extending at least partially therebetween to form a light pipe for transmitting light from said first end towards said second end, said tubular body further including a fastener for attaching a key to said key tag.

* * * * *